(12) United States Patent
Wang et al.

(10) Patent No.: US 10,417,648 B2
(45) Date of Patent: Sep. 17, 2019

(54) SYSTEM AND COMPUTER READABLE MEDIUM FOR FINDING CROWD MOVEMENTS

(71) Applicant: INDUSTRIAL TECHNOLOGY RESEARCH INSTITUTE, Hsinchu (TW)

(72) Inventors: En-Tzu Wang, Kaohsiung (TW); Tai-Ting Wu, Zhubei (TW); Chi-Chun Kao, Taipei (TW); Chao-Chih Wang, Tainan (TW); I-Hong Kuo, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 365 days.

(21) Appl. No.: 14/936,674

(22) Filed: Nov. 9, 2015

(65) Prior Publication Data

US 2017/0132305 A1    May 11, 2017

(51) Int. Cl.
  *G06F 17/00*  (2019.01)
  *G06Q 30/02*  (2012.01)

(52) U.S. Cl.
  CPC .................. *G06Q 30/02* (2013.01)

(58) Field of Classification Search
  CPC ....................................................... G06F 19/24
  See application file for complete search history.

(56) References Cited

U.S. PATENT DOCUMENTS

| 7,558,622 B2 | 7/2009 | Tran |
| 7,733,224 B2 | 6/2010 | Tran |
| 8,612,134 B2 | 12/2013 | Zheng et al. |
| 2004/0006559 A1* | 1/2004 | Gange ................. G06F 17/3053 |
| 2011/0071881 A1 | 3/2011 | Zheng et al. |
| 2015/0039217 A1 | 2/2015 | Deshpande et al. |
| 2015/0227934 A1* | 8/2015 | Chauhan ............ G06Q 20/4016 705/44 |

FOREIGN PATENT DOCUMENTS

| CN | 102638821 A | 8/2012 |
| CN | 103914563 A | 7/2014 |
| TW | 200818067 A | 4/2008 |
| TW | 201000934 A | 1/2010 |

(Continued)

OTHER PUBLICATIONS

Yongxi Gong et al., "Exploring Spatiotemporal Characteristics of IntraUrban Trips Using Metro Smartcard Records", 2012.

(Continued)

*Primary Examiner* — Hung Q Pham
(74) *Attorney, Agent, or Firm* — Rabin & Berdo, P.C.

(57) ABSTRACT

A method for finding crowd movements is provided. The method includes: collecting location data associated with multiple user devices, mining frequent patterns in the location data to generate multiple representative sequences, and grouping the representative sequences into clusters to find crowd movements according to sequence distances between the representative sequences. Each representative sequence includes at least one line segment between a starting location point and an end location point.

22 Claims, 17 Drawing Sheets

(56) References Cited

FOREIGN PATENT DOCUMENTS

TW         201336474 A     9/2013
TW          I428564 B      3/2014

OTHER PUBLICATIONS

Eric Hsueh-Chan Lu et al., "Mining Cluster-based Mobile Sequential Patterns in Location-Based Service Environments".
Jae-Gil Lee et al., "Trajectory Clustering: A Partition-and-Group Framework", 2007.
Jieming Shi et al., "Density-based Place Clustering in Geo-Social Networks", 2014.
Josh Jia-Ching Ying et al., "Semantic Trajectory Mining for Location Prediction", 2011.
Quannan Li et al., "Mining User Similarity Based on Location History", 2008.
Taiwanese Office Action dated Jan. 6, 2017.

\* cited by examiner

| uid | departure | arrival | date time | amount | type |
|---|---|---|---|---|---|
| 677 | (40.711951, -74.008464) | - | 2013-05-01 16:41:43 | $8.5 | buy |
| 604 | (40.713806, -74.007026) | - | 2013-05-01 18:39:21 | $11.5 | buy |
| 604 | (40.713253, -74.007026) | (40.710715, -74.011125) | 2013-05-01 18:42:22 | $2 | traffic |
| 677 | (40.710357, -74.010373) | - | 2013-05-01 21:08:08 | $15 | buy |
| 677 | (40.709967, -74.010652) | - | 2013-05-01 21:17:52 | $13.4 | buy |

FIG. 3

| uid | reference point |
|---|---|
| 604 | Ref_a |
| 604 | Ref_d |
| 604 | Ref_e |
| 677 | Ref_h |
| 677 | Ref_c |
| 677 | Ref_c |

| May 1, AM 06:30-09:30 | |
|---|---|
| <Ref_d, Ref_e> | 250 |
| <Ref_a, Ref_d, Ref_e> | 243 |
| <Ref_h, Ref_c> | 230 |

| May 2, AM 06:30-09:30 | |
|---|---|
| <Ref_d, Ref_e> | 251 |
| <Ref_h, Ref_c> | 248 |

⋮

| May 31, AM 06:30-09:30 | |
|---|---|
| <Ref_d, Ref_e> | 245 |
| <Ref_a, Ref_d, Ref_e> | 235 |

| May, AM 06:30-09:30 | | |
|---|---|---|
| <Ref_d, Ref_e> | 5750 | 23/23 |
| <Ref_a, Ref_d, Ref_e> | 5661 | 23/23 |
| <Ref_h, Ref_c> | 5532 | 23/23 |

FIG. 8

SYSTEM AND COMPUTER READABLE MEDIUM FOR FINDING CROWD MOVEMENTS

TECHNICAL FIELD

The disclosure relates to a method for finding crowd movements by collecting location data associated with user devices.

BACKGROUND

For many companies and organizations, such as a chain of convenience stores, a public transit corporation, and a local government, it may be important to learn how the people move in a city or even cross cities. For these organizations, there are many key decisions relying upon the information of where the people are and where they come and go. Examples of such decisions include setting new bus routes, building new traffic stations, opening new stores, and building city facilities. Thus there is a need for a method for finding crowd movements.

SUMMARY

The disclosure relates to a method for finding crowd movements by collecting location data associated with user devices.

According to one embodiment, a method for finding crowd movements is provided. The method includes: collecting location data associated with multiple user devices, mining frequent patterns in the location data to generate multiple representative sequences, and grouping the representative sequences into clusters to find crowd movements according to sequence distances between the representative sequences. Each representative sequence includes at least one line segment between a starting location point and an end location point.

According to another embodiment, a non-transitory computer readable medium with instructions stored thereon for finding crowd movements is provided. The instructions stored thereon, when executed on a processor, perform the following steps: collecting location data associated with multiple user devices, mining frequent patterns in the location data to generate multiple representative sequences, and grouping the representative sequences into clusters to find crowd movements according to sequence distances between the representative sequences. Each representative sequence includes at least one line segment between a starting location point and an end location point.

BRIEF DESCRIPTION OF THE DRAWINGS

FIG. 3 shows an example of a payment log related to location data and time captured from multiple user devices.

FIG. 8 shows an example of aggregating representative sequences according to an embodiment of this disclosure.

Figure 1:
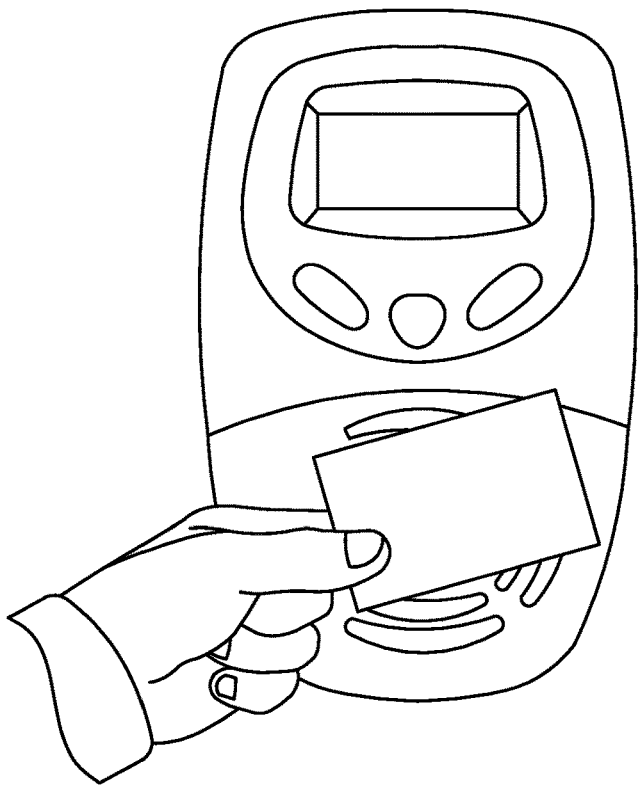
FIG. 1 shows a diagram illustrating an exemplary payment activity with a smart card.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Nowadays many people use a smart card or an electronic fare card to take public transportation, such as city buses, trains, rapid transit, and subways. In addition, the smart card may serve as an electronic wallet for buying things. For example, smart cards may be loaded with funds to pay parking meters, vending machines, and may also be used to enter a train station. FIG. 1 shows a diagram illustrating an exemplary payment activity with a smart card. In this example the smart cards is a contactless smart card. A payment log or a traffic log is generated every time the smart card is used. Because the vending machine or the ticket gate in a station has static geographical information, location data regarding multiple users' smart card usage may be collected. A payment service provider issuing the smart cards may thus collect theses payment logs to obtain information about where the people are and how the people move.

Figure 2:
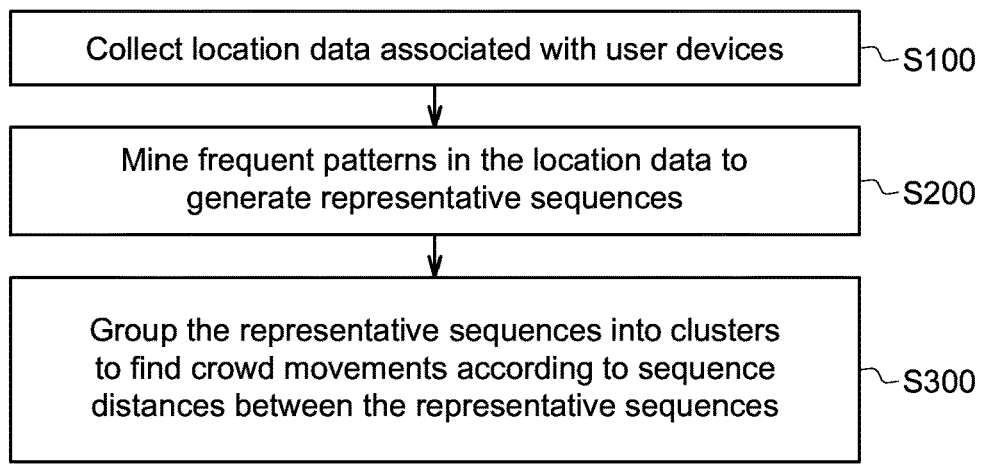
FIG. 2 shows a flowchart illustrating a method for finding crowd movements according to an embodiment of this disclosure.

FIG. 2 shows a flowchart illustrating a method for finding crowd movements according to an embodiment of this disclosure. The method includes the following steps. Step S100: collecting location data associated with multiple user devices. Step S200: mining frequent patterns in the location data to generate multiple representative sequences. Step S300: grouping the representative sequences into clusters to find crowd movements according to sequence distances between the representative sequences. Each representative sequence includes at least one line segment between a starting location point and an end location point. The method may be implemented by a computer with a processor and a non-transitory computer readable medium. For example, the method may be implemented by a software program to be stored on a compact disk. The program may be loaded into a memory as instructions to be executed by the processor to perform the above mentioned steps. The detailed description of each step is given below.

Step S100: collecting location data associated with multiple user devices. The user devices may be smart cards, electronic fare cards, or mobile devices with paying capabilities. The location data may be collected when the user devices are used for payment activity. For example, when a smart card is used for paying at a payment terminal, a report including identification of the smart card, payment amount, date time, location of the payment terminal, may be uploaded to a central server. However the method is not limited to collecting data during a payment activity. The location data may also be collected when the user devices are used to enter a metro station, when money is deposited in the user devices, or when the user devices are used for authentication to enter a building. For ease of understanding and for convenience, examples of collecting location data during payment activity will be used in the following description, and the collected location data will be referred as payment logs.

FIG. 3 shows an example of a payment log related to location data and time captured from multiple user devices. The payment log may be stored in a center server of the service provider. In this example the payment log includes the following fields: uid, departure location, arrival location, date time, payment amount, and transaction type. Uid represents an identification of the user device. In other words, the same uid corresponds to the same user device, which may in turn correspond to the same user. Therefore information regarding what place a person has been to may be obtained. By collecting the location data of multiple user devices, the service provider may be able to learn what moving trajectories are common to most people. The transaction type may be "buy", "traffic", "deposit", or other types. For the type "traffic", payment may be done at the destination station. The departure location and arrival location record the related traffic information, such as the geographic coordinates of the departure station and the arrival station. For types other than "traffic", the departure location keeps the location where this payment log is generated and "-" is assigned to the arrival location.

Figure 4:
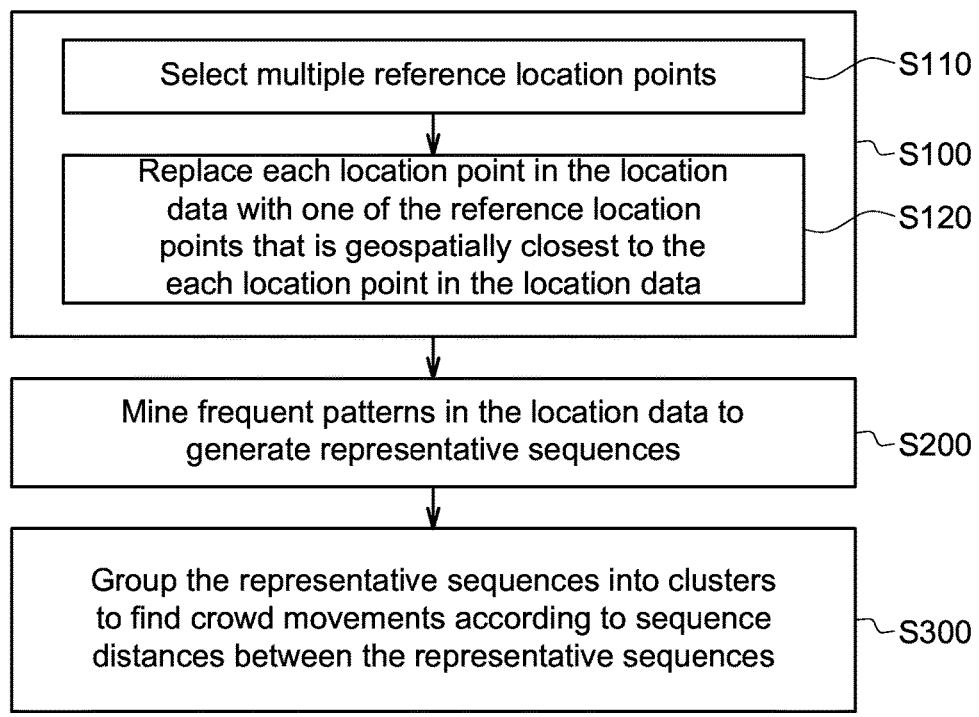
FIG. 4 shows a flowchart illustrating a method for collecting location data associated with the user devices according to an embodiment of this disclosure.

In the above example, the recorded coordinates may be precise location data. The number of different precise locations of payment logs may be very large due to, for example, a huge number of stores using this payment service. For finding crowd movements of interest, the exact and precise locations may not be needed. Therefore locations nearby may be regarded as a semantic region. A reference location point may be selected to be representative of one semantic region. The step S100 may include steps S110 and S120 as shown in FIG. 4, which shows a flowchart illustrating a method for collecting location data associated with the user devices according to an embodiment of this disclosure.

Figure 5A:
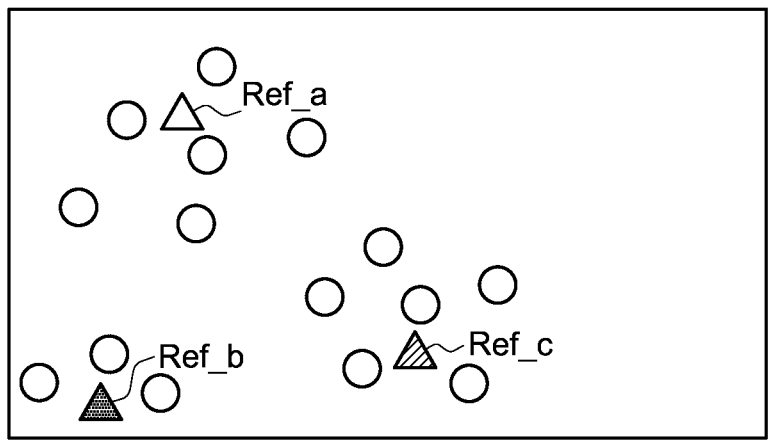
FIG. 5A and FIG. 5B show an example of tagging a payment location by a closest reference location point according to an embodiment of this disclosure.
Figure 5B:
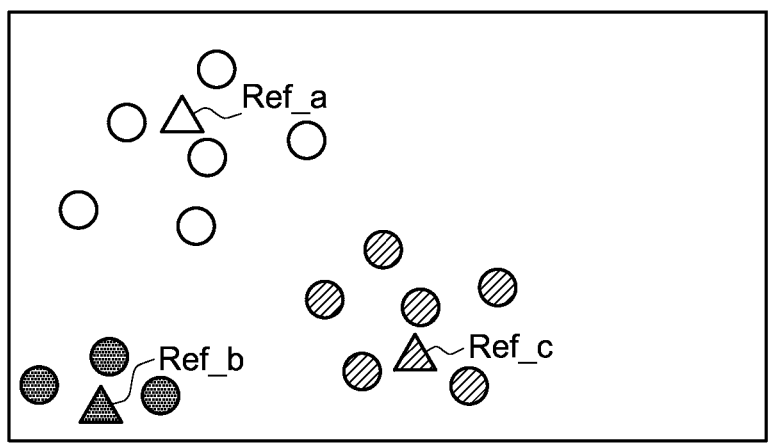

Step S110: Select multiple reference location points. Examples of reference points include elementary schools, stores of a chain of convenience stores, and landmarks set according to the resident population. Step S120: Replace each location point in the location data with one of the reference location points that is geospatially closest to the each location point in the location data. For each payment log entry, the original precise location point may be replaced by a nearest reference point. FIG. 5A and FIG. 5B show an example of tagging a payment location by a closest reference location point according to an embodiment of this disclosure. FIG. 5A shows three pre-selected reference points Ref_a, Ref_b, Ref_c as three different shaded triangles and the original payment locations as empty circles. Each payment location may then be replaced by a geospatially closest reference location point. As shown in FIG. 5B, each payment location is shaded the same as its corresponding reference location point. After tagging the payment locations by the closest reference points, the geographic coordinates in the original payment log may be replaced by these reference points. Step S110 and S120 are optional steps, that is, the following steps S200 and S300 may still be applicable if the original payment locations are kept in the payment log.

Step S200: mining frequent patterns in the location data to generate multiple representative sequences. After the phase of data collection and aforementioned preprocessing, the payment log may be transformed into a set of payment sequences. Each payment sequence includes a sequence of items, representing the whole payment trajectory of a specific user in a specific time period. An item in a payment sequence may be a reference location point as shown in FIG. 5A and FIG. 5B. An example payment sequence may look like: {id_677: Ref_h, Ref_c, Ref_c}. From a set of payment sequences, frequent patterns may be found by sequential pattern mining algorithms, such as PrefixSpan or Generalized Sequential Pattern (GSP) algorithm. The representative sequences and the corresponding support count (the number of appearance, which may be obtained in the mining algorithm) for a specific time period may be found after the sequential pattern mining. Each representative sequence includes at least one line segment between a starting location point and an end location point. The starting location point and the end location point may either be a precise location or a reference location point. For example, a payment log entry corresponding to "traffic" type may be regarded as a line segment between the departure location and the arrival location. An example representative sequence may be <Ref_a, Ref_d, Ref_e>, which includes two line segments: one from Ref_a to Ref_d and the other from Ref_d to Ref_e.

Figures 6, 7:
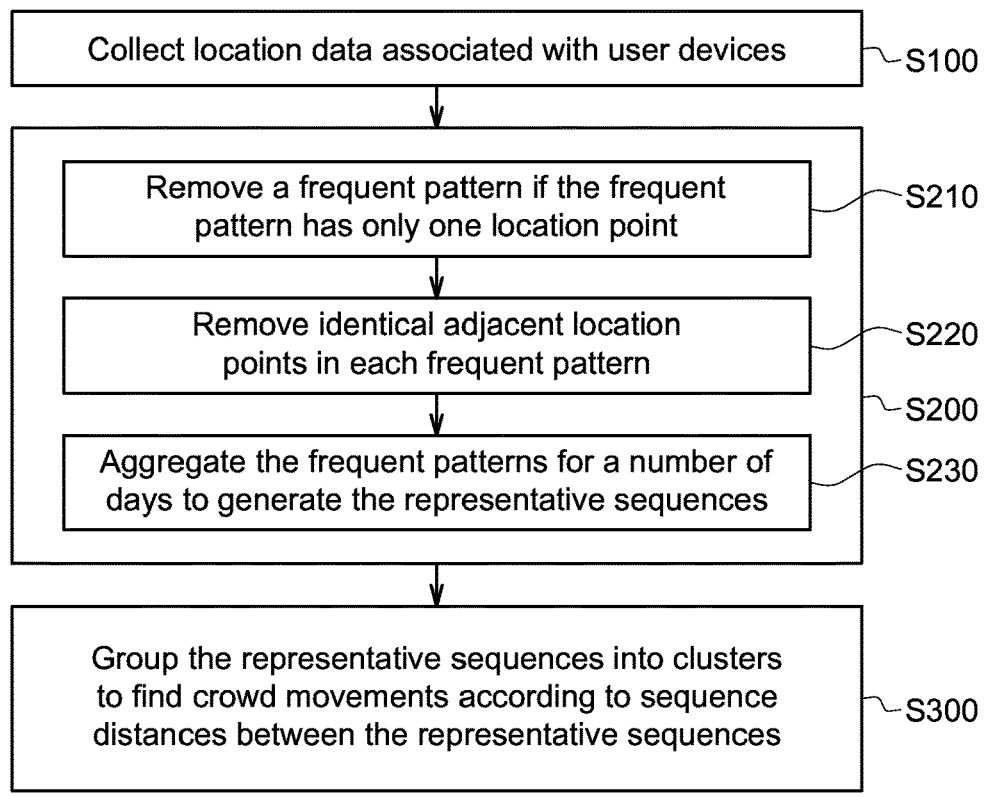
FIG. 6 shows an example of an arranged and simplified payment log according to an embodiment of this disclosure.
FIG. 7 shows a flowchart illustrating a method for mining the frequent patterns in the location data to generate the representative sequences according to an embodiment of this disclosure.

In the step S200, the payment log may first be sorted according to uid and date time. For example, the transactions related to the same user device are grouped together, and the payment entries related to this user device are sorted in chronological order. In addition, each location point may be tagged by a nearest reference location point as shown in FIG. 5B. FIG. 6 shows an example of an arranged and simplified payment log according to an embodiment of this disclosure. A payment sequence may be formed for the uid 604: <Ref_a, Ref_d, Ref_e>, and another payment sequence may be formed for the uid 677: <Ref_h, Ref_c, Ref_c>. Pattern mining algorithms may then be applied to the set of payment sequences to find the frequent patterns.

FIG. 7 shows a flowchart illustrating a method for mining the frequent patterns in the location data to generate the representative sequences according to an embodiment of this disclosure. The step S200 may include steps S210, S220, and S230 which are performed after pattern mining. Step S210: remove a frequent pattern if the frequent pattern has only one location point. Step S220: remove identical adjacent location points in the frequent patterns. Because the method is to find crowd movements, the frequent patterns that represent the meaning of staying at the same place, e.g. <Ref_a> and <Ref_a, Ref_a>, are pruned. In addition, the frequent patterns that include at least two identical adjacent items, e.g. <Ref_h, Ref_c, Ref_c> are also pruned. The representative sequences thus obtained do not include adjacent identical items. Each line segment in each representative sequence indicates a crowd movement direction.

Step S230: aggregate the frequent patterns for several days to generate the representative sequences. The payment logs collected may be categorized according to different time periods and different days. This is because the crowd movement trajectories may be different during different time periods in a day. For example, 6:30 am-9:30 am, 10:30 am-1:30 pm, 4:30 pm-7:30 pm may correspond to different crowd activities. If a statistical analysis in a particular time period over several days is desired, the corresponding frequent patterns in that time period may be aggregated. FIG. 8 shows an example of aggregating representative sequences according to an embodiment of this disclosure. In this example, the representative sequences during time period 6:30 am-9:30 am of all the work days in May are aggregated. The number shown in the table represents the support of each representative sequence. As shown in FIG. 8, the supports of the sequence <Ref_d, Ref_e> in each work day are accumulated to generate to the total support equal to 5750 in May. The number 23/23 shown in the aggregated sequence represents the occurrence rate, meaning that the representative sequence <Ref_d, Ref_e> appears 23 times out of 23 work days. By aggregating statistics over several days, the movement trend of most people can be identified more accurately.

Step S300: grouping the representative sequences into clusters to find crowd movements according to sequence distances between the representative sequences. After performing the steps S100 and S200, the representative sequences regarding crowd movements have been found. Similar representative sequences are further grouped into clusters to find crowd movements in regions with larger granularity. It is beneficial because most crowd movements of interest are related to movements between two large areas rather than between two specific buildings. In step S300, a sequence distance between two representative sequences are calculated to determine how similar these two representative sequences are. For example, a shorter sequence distance means a higher similarity between these two representative sequences (such as being closer geographically). The representative sequences are then grouped into clusters according to the sequence distances thus calculated.

As for the calculation of the sequence distance, an example is given below. A representative sequence may be regarded as a sequence of line segments. In this example the representative sequences include a first sequence Seq_a and a second sequence Seq_b. The first sequence includes a first line segment L1 between a first start location point L1_s and a first end location point L1_e. The second sequence Seq_b includes a second line segment L2 between a second start location point L2_s and a second end location point L2_e. The sequence distance between the first sequence Seq_a and the second sequence Seq_b is determined according to a segment distance between the first line segment L1 and the second line segment L2. The first line segment L1 is directional (starting from the first start location point L1_s and pointing toward the first end location point L1_e), and so is the second line segment L2. Therefore the first line segment L1 and the second line segment L2 may be represented as vectors $\vec{L1}$ and $\vec{L2}$ in the following description.

Figure 9:
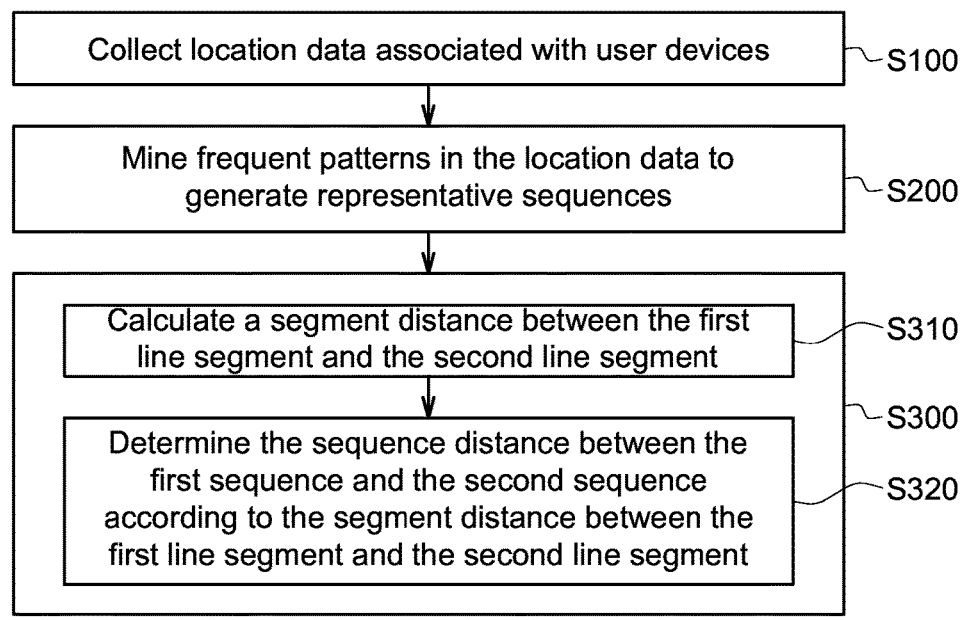
FIG. 9 shows a flowchart illustrating a method for calculating sequence distances between the representative sequences according to an embodiment of this disclosure.

FIG. 9 shows a flowchart illustrating a method for calculating sequence distances between the representative sequences according to an embodiment of this disclosure. The first sequence Seq_a and the second sequence Seq_b form a sequence pair among the representative sequences. The step S300 (grouping the representative sequences into the clusters) may include the following steps for each sequence pair. Step S310: Calculate a segment distance between the first line segment L1 and the second line segment L2. The segment distance indicates how close or how similar these two line segments are. Step S320: Determine the sequence distance between the first sequence and the second sequence according to the segment distance between the first line segment and the second line segment. In other words, the similarity between two representative sequences is determined according to the similarity between their respective line segments.

Figure 10:
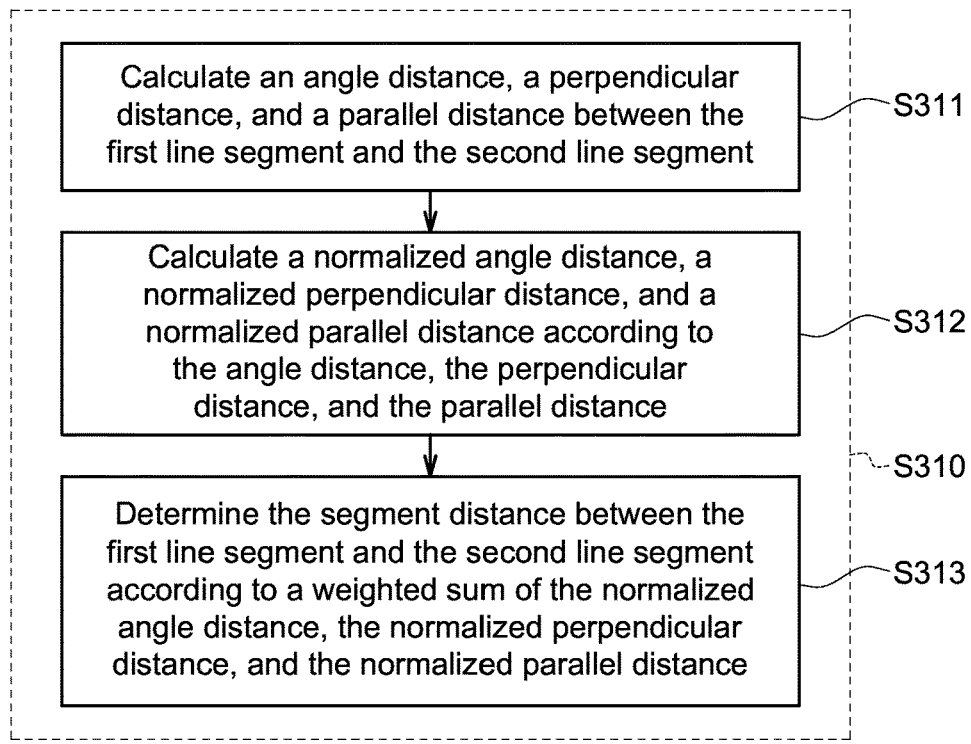
FIG. 10 shows a flowchart illustrating a method for calculating the segment distance between the first line segment and the second line segment according to an embodiment of this disclosure.

FIG. 10 shows a flowchart illustrating a method for calculating the segment distance between the first line segment and the second line segment according to an embodiment of this disclosure. The step S310 may include the following steps. Step S311: Calculate an angle distance, a perpendicular distance, and a parallel distance between the first line segment and the second line segment. Step S312: Calculate a normalized angle distance, a normalized perpendicular distance, and a normalized parallel distance according to the angle distance, the perpendicular distance, and the parallel distance. The values of the normalized angle distance, the normalized perpendicular distance, and the normalized parallel distance are in the same range. Step S313: Determine the segment distance between the first line segment and the second line segment according to a weighted sum of the normalized angle distance, the normalized perpendicular distance, and the normalized parallel distance. An example regarding the calculation of the segment distance between two line segments is given below.

Figure 11:
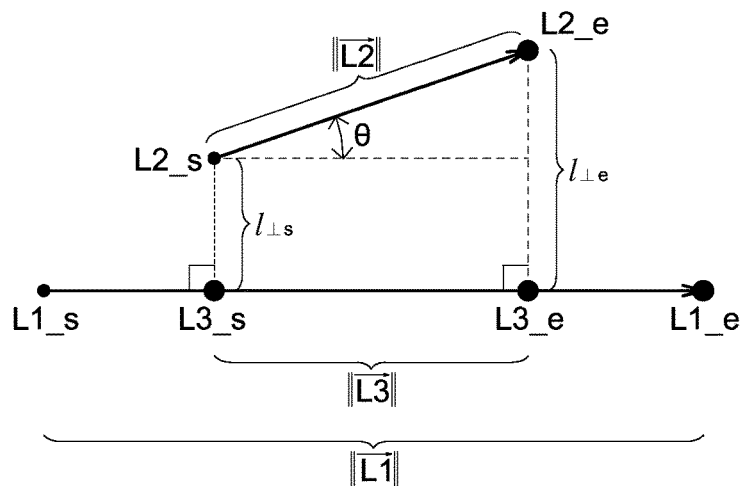
FIG. 11 shows a diagram illustrating a segment distance between two line segments according to an embodiment of this disclosure.

FIG. 11 shows a diagram illustrating a segment distance between two line segments according to an embodiment of this disclosure. The segment distance is determined based on three components, including an angle distance $d_\theta$, a perpendicular distance $d_\perp$, and a parallel distance $d_\parallel$. The angle distance $d_\theta$ is related to the intersecting angle $\theta$ between $\vec{L1}$ and $\vec{L2}$ ($0 \leq \theta \leq 180°$). For example, the intersecting angle may be obtained by $$\theta = \cos^{-1}\left(\frac{\vec{L1} \cdot \vec{L2}}{\|\vec{L1}\| \times \|\vec{L2}\|}\right),$$

where $\vec{L1} \cdot \vec{L2}$ is the dot product of the two vectors, $\|\vec{L1}\|$ and $\|\vec{L2}\|$ are the lengths of the two vectors. The angel distance $d_\theta$ may be obtained by the formula:

$$d_\theta = \begin{cases} \min(\|\vec{L1}\|, \|\vec{L2}\|) \times \sin\theta, & \text{if } 0° \leq \theta \leq 90° \\ \min(\|\vec{L1}\|, \|\vec{L2}\|) & \text{otherwise} \end{cases} \quad (1)$$

The angel distance $d_\theta$ represents the similarity in direction between these two vectors. The smaller the intersecting angle θ is, the smaller the angle distance $d_\theta$ is. When the intersecting angle θ is larger than 90° however, the two vectors are substantially pointing to opposite directions. The angle distance $d_\theta$ could be set to be a maximum possible value in the domain of the angle distance in this case to represent that these two vectors are not similar in direction.

Figure 12:
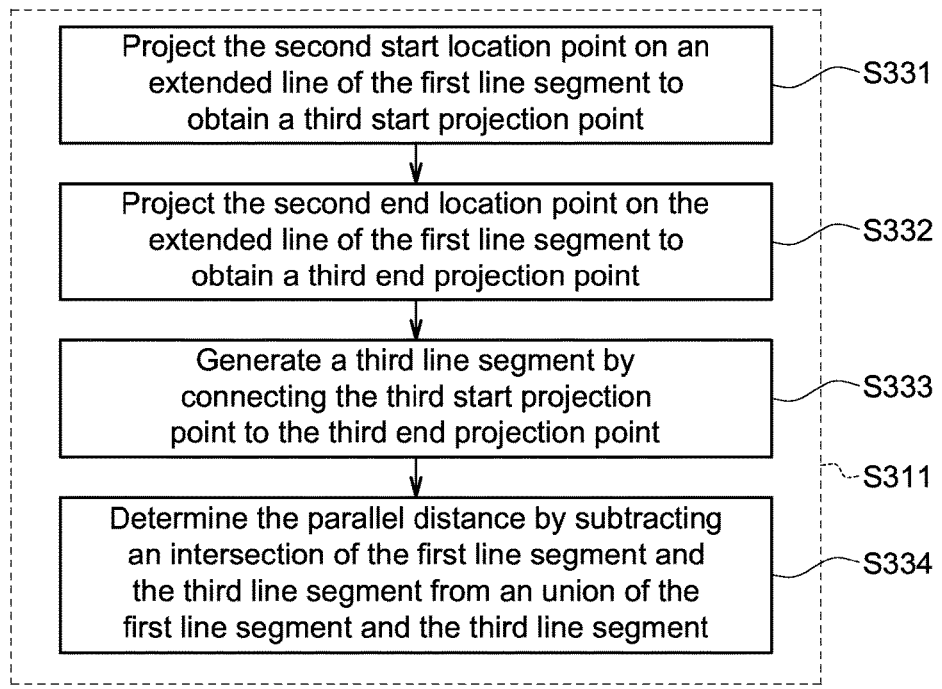
FIG. 12 shows a flowchart illustrating a method for calculating the parallel distance between the first line segment and the second line segment according to an embodiment of this disclosure.

FIG. 12 shows a flowchart illustrating a method for calculating the parallel distance between the first line segment and the second line segment according to an embodiment of this disclosure. The step S311 includes the following steps. Step S331: Project the second start location point on an extended line of the first line segment to obtain a third start projection point. Step S332: Project the second end location point on the extended line of the first line segment to obtain a third end projection point. Step S333: Generate a third line segment by connecting the third start projection point to the third end projection point. The third start projection point L3_s, the third end projection point L3_e, and the third line segment L3 thus formed are shown in FIG. 11. Step S334: Determine the parallel distance by subtracting an intersection of the first line segment and the third line segment from an union of the first line segment and the third line segment. The parallel distance $d_\parallel$ may be obtained by the formula:

$$d_\parallel = L1 \cup L3 - L1 \cap L3 \quad (2)$$

Because the third line segment L3 is formed by projecting the second line segment L2 on the first line segment L1, the third line segment L3 and the first line segment L1 must be collinear. In this example, the union of the first line segment L1 and the third line segment L3 is the length between the first start location point L1_s and the first end location point L1_e. The intersection of the first line segment L1 and the third line segment L3 is the length between the third start point L3_s and the third end point L3_e. Note that in this example the second line segment L2 is projected on the first line segment L1. In another embodiment, the parallel distance $d_\parallel$ may be obtained by projecting the first line segment L1 on the (extended) second line segment L2 (may result in a different value). The parallel distance $d_\parallel$ represents the similarity between the effective parallel lengths of these two line segments.

The perpendicular distance $d_\perp$ may be obtained by the formula:

$$d_\perp = \frac{l_{\perp s}^2 + l_{\perp e}^2}{l_{\perp s} + l_{\perp e}} \quad (3)$$

where $l_{\perp s}$ is the Euclidean distance between the second start location point L2_s and the third start point L3 s, $l_{\perp e}$ is the Euclidean distance between the second end location point L2_e and the third end point L3 e. Formula (3) represents the contraharmonic mean of $l_{\perp s}$ and $l_{\perp e}$.

Figure 13:
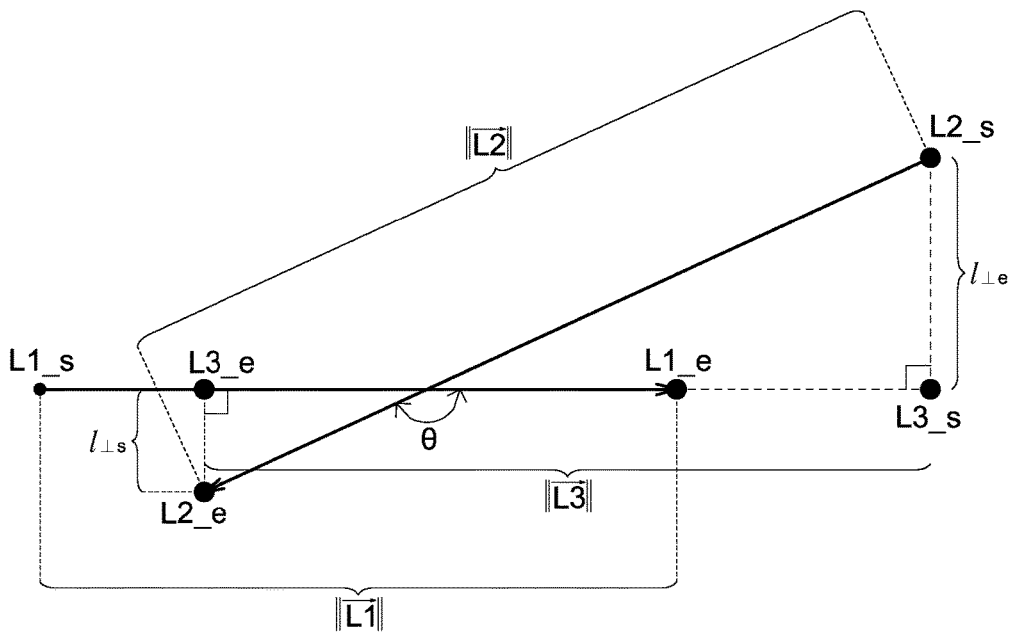
FIG. 13 shows another diagram illustrating a segment distance between two line segments according to an embodiment of this disclosure.

FIG. 13 shows another diagram illustrating a segment distance between two line segments according to an embodiment of this disclosure. The calculation of the angle distance $d_\theta$, the parallel distance $d_\parallel$, and the perpendicular distance $d_\perp$ may still be obtained by formula (1), (2), and (3), respectively. In particular, in this example the intersecting angle θ is larger than 90°, hence the angle distance $d_\theta$ is equal to $\min(\|\vec{L1}\|, \|\vec{L2}\|)$. As for the parallel distance $d_\parallel$, the union of the first line segment L1 and the third line segment L3 is the length between the first start location point L1_s and the third end point L3 e. The intersection of the first line segment L1 and the third line segment L3 is the length between the third start point L3_s and the first end location point L1_e.

As described above, three components are taken into consideration when calculating the segment distance. However, the value ranges of these three components may vary greatly, making it difficult to obtain a direct meaningful combination of these three components. In this disclosure, in step S312 the normalized angle distance $Nd_\theta$, the normalized parallel distance $Nd_\parallel$, and the normalized perpendicular distance $Nd_\perp$ are calculated. In particular, the values of the normalized angle distance $Nd_\theta$, the normalized parallel distance $Nd_\parallel$, and the normalized perpendicular distance $Nd_\perp$ are in the same range, such as [0, 1]. Since the values of these three normalized components are in the same range, a linear combination of these three normalized components may be meaningful to measure the segment distance between two line segments. In one embodiment, the segment distance is a weighted sum of the normalized angle distance $Nd_\theta$, the normalized parallel distance $Nd_\parallel$, and the normalized perpendicular distance $Nd_\perp$, which may obtained by the formula:

$$\text{Segment Distance} = w_1 \times Nd_\theta + w_2 \times ND_\parallel + w_3 \times ND_\perp, \quad (4)$$

where $$\sum_{i=1}^{3} w_i = 1$$

For example, $w_1$, $w_2$, and $w_3$ may all be equal to ⅓ to obtain an average value of the normalized angle distance $Nd_\theta$, the normalized parallel distance $Nd_\parallel$, and the normalized perpendicular distance $Nd_\perp$.

Figure 14:
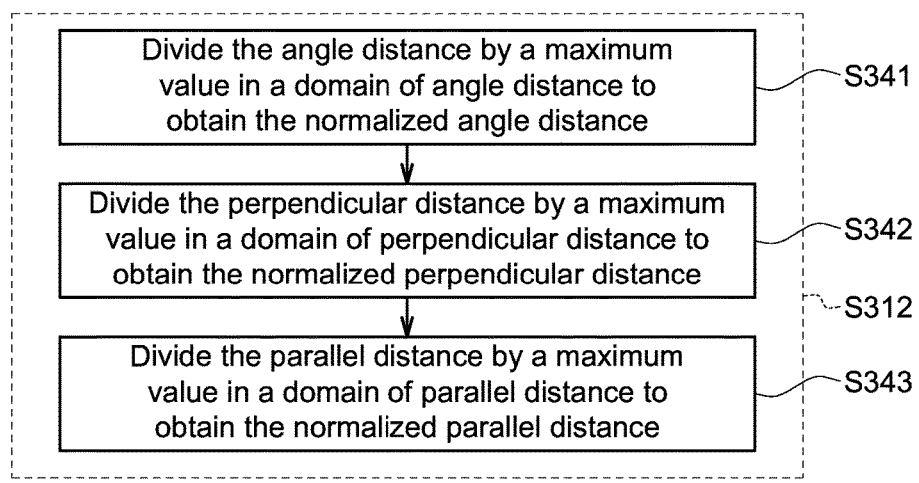
FIG. 14 shows a flowchart illustrating a method for calculating the normalized angle distance, the normalized perpendicular distance, and the normalized parallel distance according to an embodiment of this disclosure.
Figure 15A:
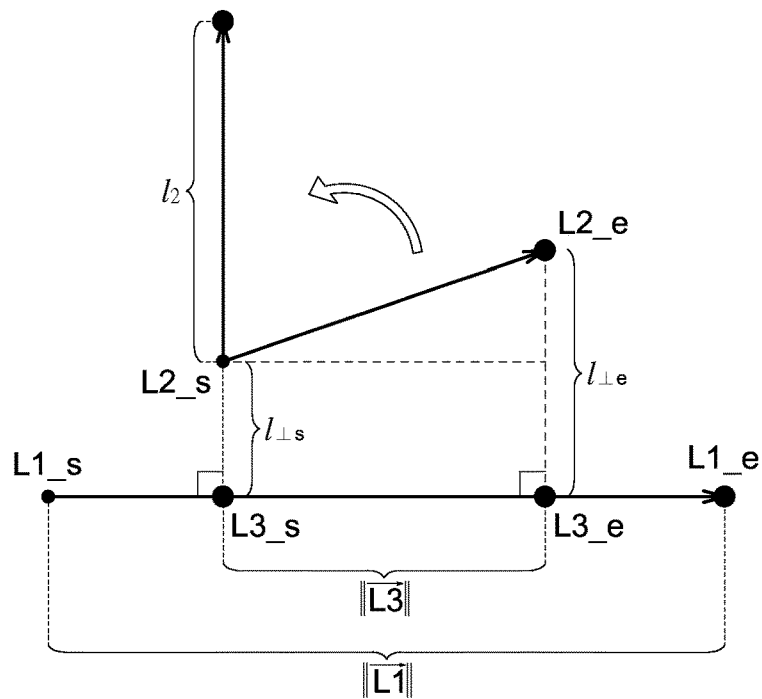
FIG. 15A-FIG. 15D show diagrams illustrating multiple scenarios when considering the maximum value in a domain of perpendicular distance according to an embodiment of this disclosure.
Figure 15B:
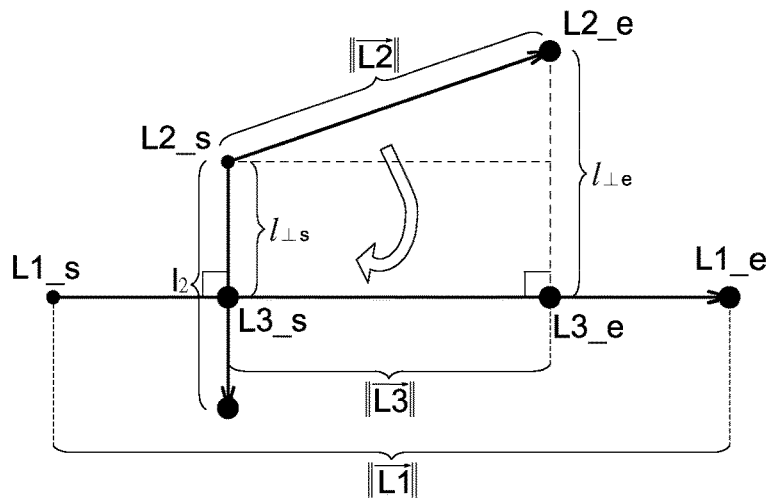
Figure 15C:
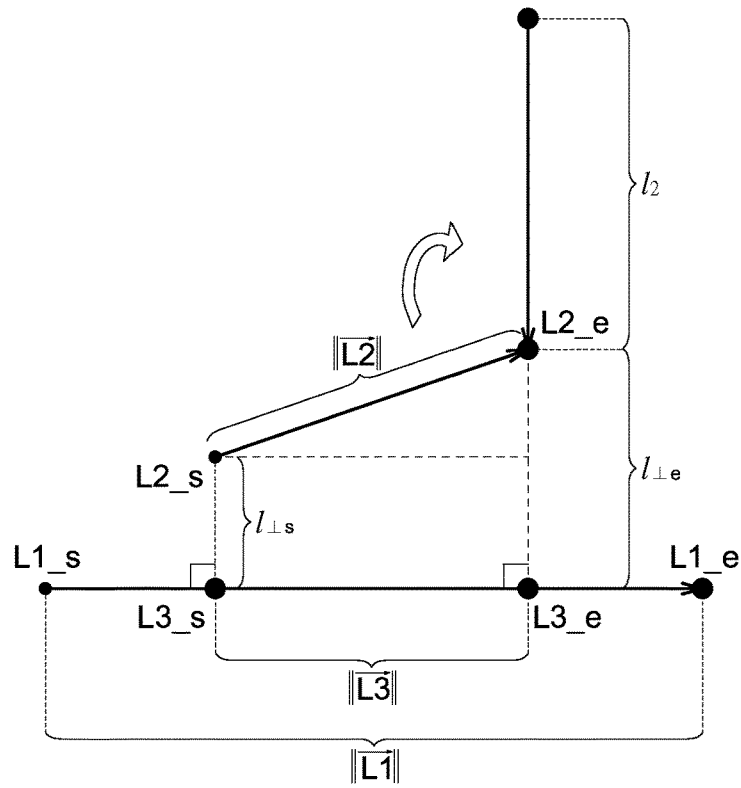
Figure 15D:
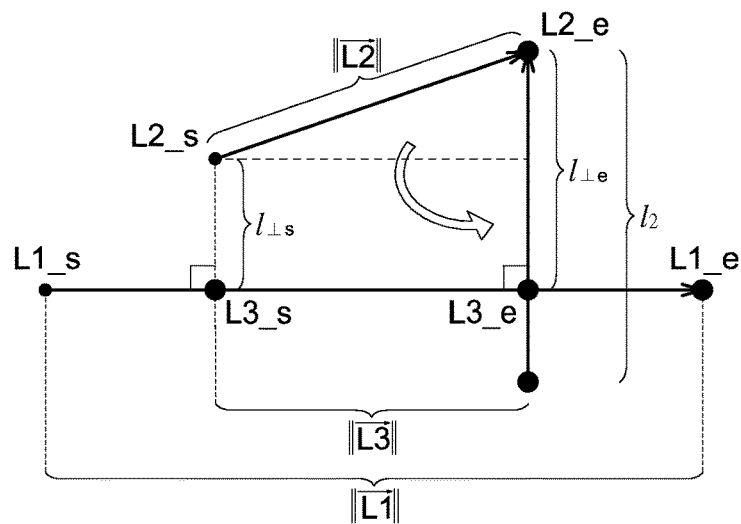

FIG. 14 shows a flowchart illustrating a method for calculating the normalized angle distance, the normalized perpendicular distance, and the normalized parallel distance according to an embodiment of this disclosure. Step S312 includes the following steps. Step S341: Divide the angle distance by a maximum value in a domain of angle distance to obtain the normalized angle distance. Step S342: Divide the perpendicular distance by a maximum value in a domain of perpendicular distance to obtain the normalized perpendicular distance. Step S343: Divide the parallel distance by a maximum value in a domain of parallel distance to obtain the normalized parallel distance. Because the normalized distance is generated by dividing a maximum possible value, all these three normalized components are in the range of [0, 1].

As can be seen in formula (1), the maximum value in the domain of angle distance $d_\theta$ is a length of the shorter of the first line segment L1 and the second line segment L2. As in formula (2), the maximum value in the domain of parallel distance $d_\parallel$ is the union of the first line segment L1 and the third line segment L3. The maximum value in the domain of perpendicular distance $d_\perp$ may not be easily seen from formula (3), of which the calculation is described below.

FIG. 15A-FIG. 15D show diagrams illustrating multiple scenarios when considering the maximum value in the domain of perpendicular distance according to an embodiment of this disclosure. From formula (3) and the geometry of the first and second line segments L1 and L2, the maximum value in the domain of perpendicular distance $d_\perp$ happens when $\vec{L1}$ is perpendicular to $\vec{L2}$. Therefore in one embodiment, the second line segment L2 is rotated around the second start location point L2_s or the second end location point L2_e until $\vec{L1} \perp \vec{L2}$. The maximum value in the domain of perpendicular distance is a perpendicular distance between the first line segment L1 and the rotated second line segment L2. Four possible rotation scenarios are shown in FIG. 15A-FIG. 15D. The maximum value in the domain of perpendicular distance $d_\perp$ is the maximum perpendicular distance in these four scenarios, which may be obtained by the formula ($l_2$ is the length of the second line segment L2):

$$\max\left(\frac{l_{\perp s}^2 + (l_{\perp s} + l_2)^2}{l_{\perp s} + (l_{\perp s} + l_2)}, \frac{l_{\perp s}^2 + |l_{\perp s} - l_2|^2}{l_{\perp s} + |l_{\perp s} - l_2|},\right. \quad (5)$$
$$\left.\frac{l_{\perp e}^2 + (l_{\perp e} + l_2)^2}{l_{\perp e} + (l_{\perp e} + l_2)}, \frac{l_{\perp e}^2 + |l_{\perp e} - l_2|^2}{l_{\perp e} + |l_{\perp e} - l_2|}\right)$$

Figure 16:
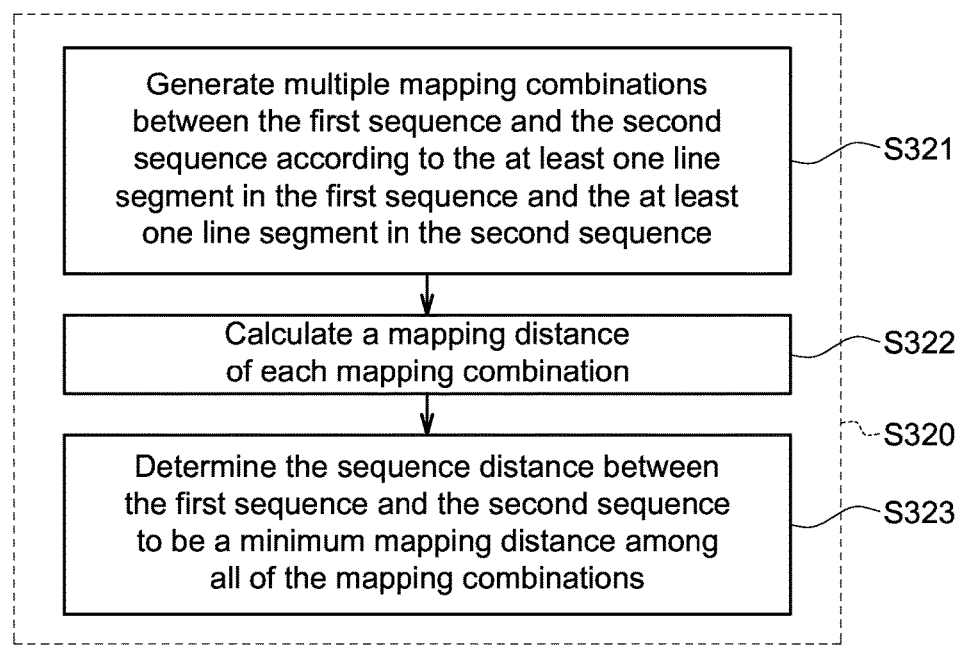
FIG. 16 shows a flowchart illustrating a method for determining the sequence distance between the first sequence and the second sequence according to an embodiment of this disclosure.

The segment distance between any two line segments may be obtained according to the procedure described above. The sequence distance between two representative sequences may be determined according to the segment distances between the line segments in respective representative sequence. FIG. 16 shows a flowchart illustrating a method for determining the sequence distance between the first sequence and the second sequence according to an embodiment of this disclosure. The step S320 includes the following step. Step S321: Generate multiple mapping combinations between the first sequence and the second sequence according to the at least one line segment in the first sequence and the at least one line segment in the second sequence. Step S322: Calculate a mapping distance of each mapping combination. Step S323: Determine the sequence distance between the first sequence and the second sequence to be a minimum mapping distance among all of the mapping combinations.

Figure 17A:
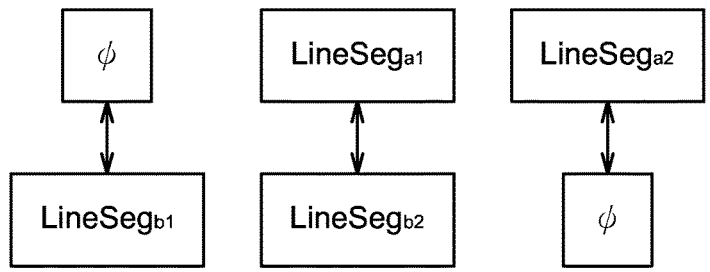
FIG. 17A-FIG. 17C show diagrams illustrating multiple mapping combinations between two representative sequences according to an embodiment of this disclosure.
Figure 17B:
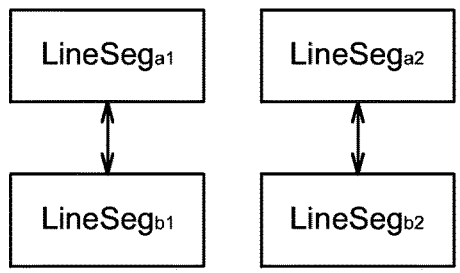
Figure 17C:
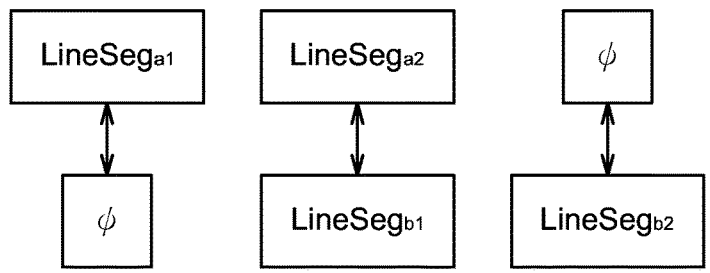

The first sequence Seq_a is a sequence of line segments arranged in time order. For example, the first sequence Seq_a includes two line segments $LineSeg_{a1}$ and $LineSeg_{a2}$, the moving trajectory $LineSeg_{a1}$ happens earlier than the moving trajectory $LineSeg_{a2}$. FIG. 17A-FIG. 17C show diagrams illustrating multiple mapping combinations between two representative sequences according to an embodiment of this disclosure. In this example, the second sequence Seq_b also includes two line segments $LineSeg_{b1}$ and $LineSeg_{b2}$ arranged in chronological order.

Figure 18:
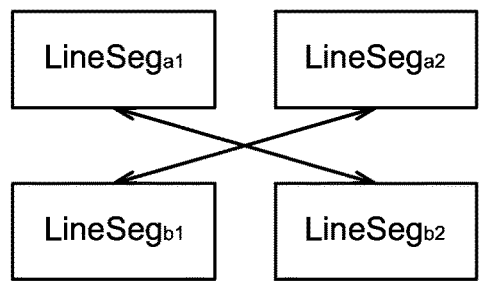
FIG. 18 shows an example of an invalid mapping between the two representative sequences.
Figure 19:
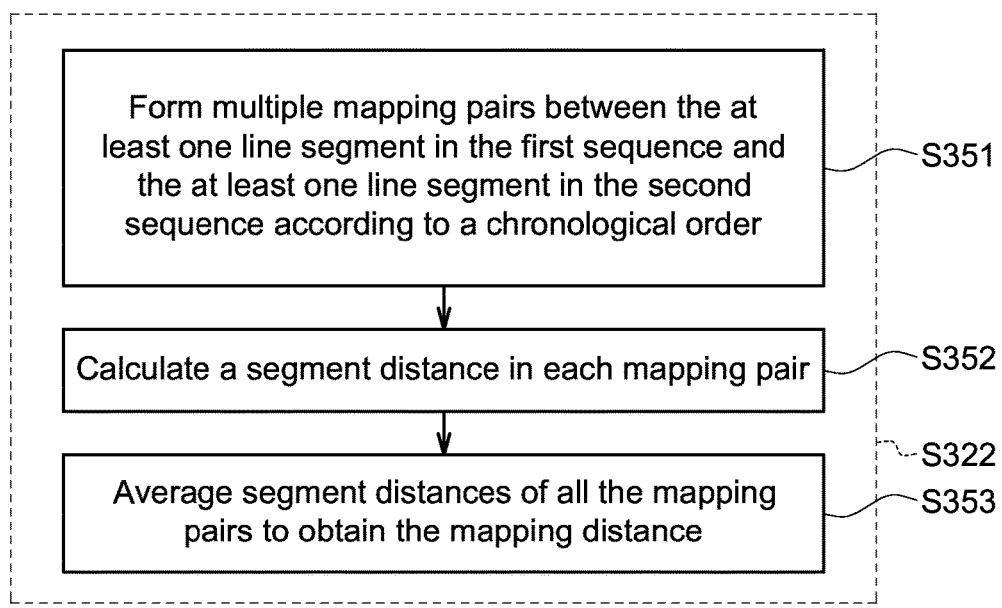
FIG. 19 shows a flowchart illustrating a method for calculating a mapping distance of a mapping combination according to an embodiment of this disclosure.

In FIG. 17A, the line segment $LineSeg_{b1}$ is mapped to an empty line segment $\phi$, the line segment $LineSeg_{b2}$ is mapped to the line segment $LineSeg_{a1}$, and the line segment $LineSeg_{a2}$ is mapped to an empty line segment $\phi$. Note that the timing relationship in each representative sequence is maintained. FIG. 17B and FIG. 17C show different mapping combinations, where the timing relationship in each representative sequence is still maintained. FIG. 18 shows an example of an invalid mapping between the two representative sequences. In this mapping the timing relationship is violated because the line segment $LineSeg_{a2}$ (mapped to the line segment $LineSeg_{b1}$) happens later than the line segment $LineSeg_{a1}$ (mapped to the line segment $LineSeg_{b2}$), however the line segment $LineSeg_{b1}$ happens earlier than the line segment $LineSeg_{b2}$. For each valid mapping combination shown in FIG. 17A-FIG. 17C, a mapping distance may be determined. The sequence distance between the first sequence Seq_a and the second sequence Seq_b is the minimum mapping distance among all of the valid mapping combinations FIG. 19 shows a flowchart illustrating a method for calculating a mapping distance of a mapping combination according to an embodiment of this disclosure. The step S322 includes the following steps. Step S351: Form multiple mapping pairs between the at least one line segment in the first sequence and the at least one line segment in the second sequence according to a chronological order. Step S352: Calculate a segment distance in each mapping pair. Step S353: Average segment distances of all the mapping pairs to obtain the mapping distance.

Refer to FIG. 17A, in this mapping combination there are three mapping pairs ($\phi$, $LineSeg_{b1}$), {$LineSeg_{a1}$, $LineSeg_{b2}$}, and {$LineSeg_{a2}$, $\phi$}. A segment distance in each mapping pair may be calculated according to the three normalized distances approach mentioned above (steps S311-S313 and formula (1)-(5)). Specifically, the segment distance between a real line segment and an empty line segment may be defined as 1 (the maximum possible value in a domain of the segment distance). The mapping distance of this mapping combination may be obtained by averaging these three segment distances. For example, the mapping distance of this mapping combination is equal to $$\left(\frac{1}{3} \times 1 + \frac{1}{3} \times Nd(LineSeg_{a1}, LineSeg_{b2}) + \frac{1}{3} \times 1\right),$$

where Nd is the segment distance between two line segments. Similarly, there are two mapping combinations in FIG. 17B, the mapping distance may be obtained by averaging these two segment distances.

Figure 20:
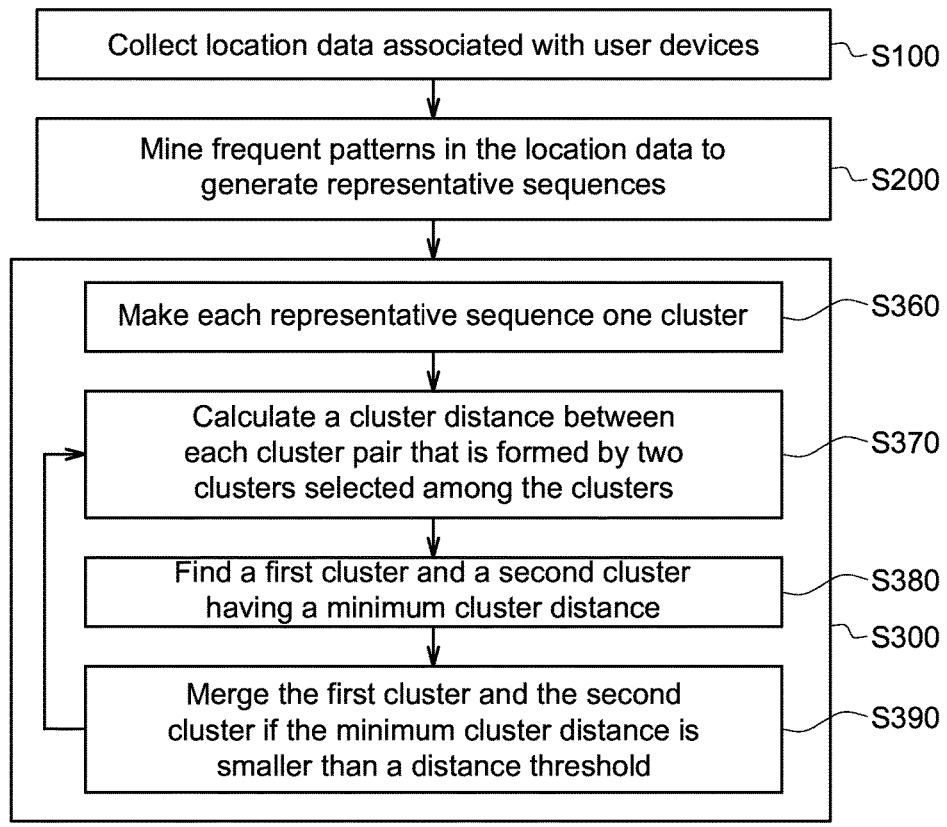
FIG. 20 shows a flowchart illustrating a method for grouping the representative sequences into clusters according to an embodiment of this disclosure.

The sequence distance between any two representative sequences may be obtained according to the procedure described above. FIG. 20 shows a flowchart illustrating a method for grouping the representative sequences into clusters according to an embodiment of this disclosure. The step S300 includes the following steps. Step S360: Make each representative sequence one cluster. Step S370: Calculate a cluster distance between each cluster pair that is formed by two clusters selected among the clusters. Step S380: Find a first cluster and a second cluster having a minimum cluster distance. Step S390: Merge the first cluster and the second cluster if the minimum cluster distance is smaller than a distance threshold.

In this embodiment, an agglomerative hierarchical clustering method is applied. Initially each representative sequence is viewed as a cluster. The cluster distance between each cluster pair (initially a pair of two representative sequences) may be calculated according to steps S351-S353. Then the two clusters having the minimum cluster distance are merged into a larger new cluster if this minimum cluster distance is smaller than a distance threshold, such as 0.3. The procedure may go back to step S370 to iteratively merge clusters. For clusters having multiple representative sequences, the cluster distance of the cluster pair may be calculated by averaging all the sequence distances between all pairs of representative sequences in the cluster pair (all-pair linkage), wherein a pair of representative sequences is formed by two representative sequences in the two respective clusters that form the cluster pair. For example, cluster G1 has two representative sequences and cluster G2 has three representative sequences, the cluster distance between cluster G1 and G2 is the average of six (2×3) sequence distances between all pairs of the representative sequences.

Figure 21:
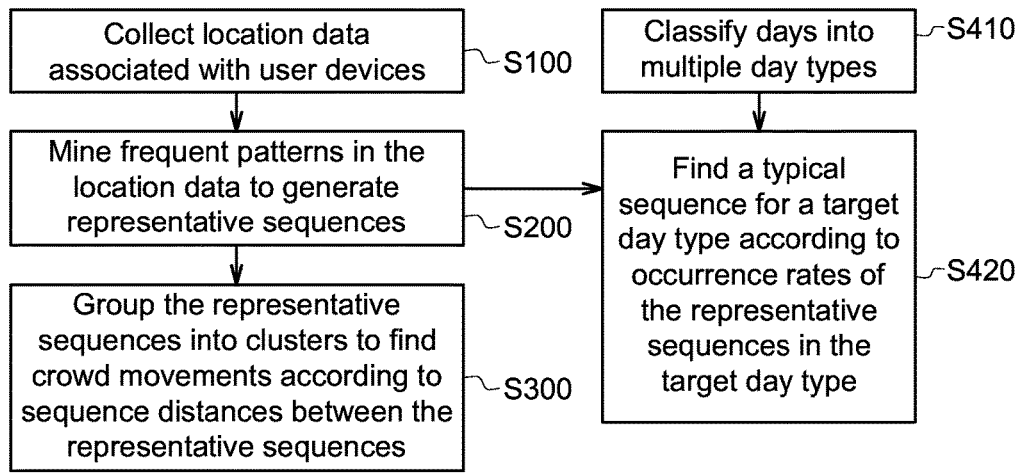
FIG. 21 shows a flowchart illustrating a method for finding crowd movements as well as finding a typical sequence according to an embodiment of this disclosure.

In one embodiment, a method for finding a typical sequence is provided. FIG. 21 shows a flowchart illustrating a method for finding crowd movements as well as finding a typical sequence according to an embodiment of this disclosure. As compared to the flowchart shown in FIG. 2, FIG. 21 includes additional steps S410 and S420. Step S410: Classify days into multiple day types. For example, days may be classified into workdays and holidays. Moreover, workdays may be classified into the last workday before one day holiday, the last workday before at least two-day holiday, the first workday after one day holiday, etc. Holidays may further be classified into one day holiday, the first day of an at least two-day holiday, the last day of an at least two-day holiday, etc. Step S420: Find a typical sequence for a target day type according to occurrence rates of the representative sequences in the target day type. As shown in FIG. 8, after aggregating data over a number of days, the representative sequences and the corresponding occurrence rate in a specific day type may be obtained. Based on the occurrence rate, a typical sequence in this specific day type may be found. For example, in the last day of an at least two-day holiday, a typical sequence between two particular train stations may be found.

Figure 22:
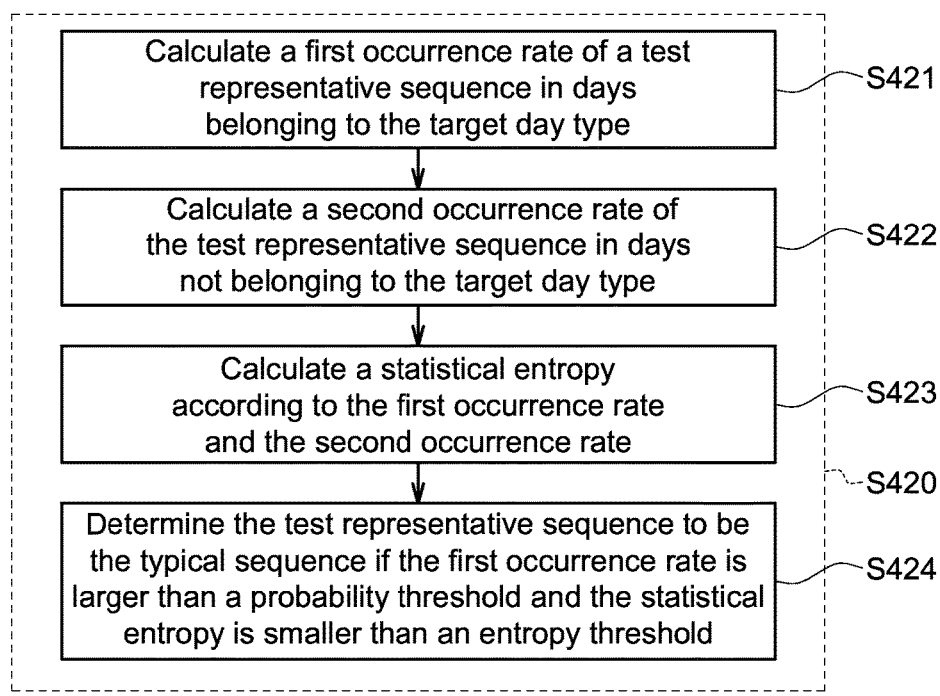
FIG. 22 shows a flowchart illustrating a method for finding a typical sequence for a target day type according to an embodiment of this disclosure.

FIG. 22 shows a flowchart illustrating a method for finding a typical sequence for a target day type according to an embodiment of this disclosure. The step S420 includes the following steps. Step S421: Calculate a first occurrence rate of a test representative sequence in days belonging to the target day type. Step S422: Calculate a second occurrence rate of the test representative sequence in days not belonging to the target day type. Step S423: Calculate a statistical entropy according to the first occurrence rate and the second occurrence rate. Step S424: Determine the test representative sequence to be the typical sequence if the first occurrence rate is larger than a probability threshold and the statistical entropy is smaller than an entropy threshold.

The occurrence rate of the test representative sequence in the step S421 may be obtained after performing step S230 (aggregating data for a number of days, as shown in FIG. 8). An example is given below to illustrate the calculation performed in the steps S421-S424. The target day type in this example is the first day of a holiday with more than one days, denoted as class H. On the other hand, (all-H) represent holidays other than the first day of a holiday with more than one days. Two representative sequences with their corresponding occurrence rates are shown in Table 1 below.

TABLE 1

| Representative Sequence | Occurrence rate in H | Occurrence rate in (all-H) | Entropy |
| --- | --- | --- | --- |
| R1 <Ref_a, Ref_d, Ref_e> | 41/56 | 2/128 | 0.10 |
| R2 <Ref_i, Ref_e> | 28/56 | 50/128 | 0.69 |

The occurrence rate is how many times this sequence appears in these days. For example, sequence R1 appears in 41 days out of total 56 holidays belonging to class H, and appears in only 2 days out of total 128 holidays belonging to class (all-H). The probability threshold $P_{th}$ is 0.2 and the entropy threshold $S_{th}$ is 0.6 in the step S424. The statistical entropy in the step S423 may be obtained by the formula:

$$S = -\sum_{i \in \{A, \overline{A}\}} p_i \log p_i, \qquad (6)$$

where $p_i$ is the probability the sequence in class $i$

According to the formula (6), the entropy S1 of the sequence R1 is equal to $$-\left(\frac{41/56}{41/56 + 2/128}\right)\log\left(\frac{41/56}{41/56 + 2/128}\right) - \left(\frac{2/128}{41/56 + 2/128}\right)\log\left(\frac{2/128}{41/56 + 2/128}\right) = 0.1.$$

A larger entropy means the probability distribution is closer to uniform distribution. On the other hand, a smaller entropy means the probability distribution is biased to one end. In the example, if the probability distribution is biased toward class H, then the sequence is regarded as typical in days belonging to class H. In the step S424, Because the occurrence rate (41/56) is larger than the probability threshold $P_{th}$ and the entropy S1=0.1 is smaller than the entropy threshold $S_{th}$, the sequence R1 is determined to be a typical sequence in days belonging to class H. Similarly, the entropy of S2 of the sequence R2 may be calculated according to the formula (6) as well, yielding the entropy S2=0.69, which is larger than the entropy threshold $S_{th}$. Therefore the sequence R2 is not a typical sequence is days belonging to class H. As can be seen in Table 1, the first occurrence rate (28/56) and the second occurrence rate (50/128) of the sequence R2 are similar. The sequence R2 does not appear significantly in particular day types, and hence is not a typical sequence. After finding several typical sequences for a particular day type, the typical sequences may further be grouped into clusters to according to the steps S360, S370, S380, and S390.

According to the method for finding crowd movements of the above embodiments, the moving trajectories of the crowd may be identified by collecting location data captured from user devices, such as smart cards. The payment service provider issuing the smart cards may rely on the generated crowd movement information to estimate card holders in a particular region, design marketing and advertising programs accordingly, decide where to build a new store, etc. Many applications and important decisions can be made depending on the crowd movements. Furthermore, because typical sequences for particular day types may also be found, the payment service provider is able to plan and organize different activities on different days depending on the typical sequences.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A crowd movements information system, comprising:
a processor that performs the following steps, the steps comprising:
collecting a plurality of location data associated with a plurality of user devices of a crowd, according to logs of the plurality of user devices;
mining a plurality of frequent patterns in the plurality of location data to generate a plurality of representative sequences regarding information on movements of the crowd, wherein each representative sequence comprises a plurality of sequences and each sequence comprises at least one line segment between a starting location point and an end location point, wherein each at least one line segment in each of the plurality of representative sequences is a directional line segment indicating movement direction of the crowd;
for each sequence pair of the plurality of sequences:
calculating an angle distance, a perpendicular distance, and a parallel distance between a first line segment of a first sequence and a second line segment of a second sequence;
dividing the angle distance by a maximum value in a domain of angle distance to obtain a normalized angle distance;
dividing the perpendicular distance by a maximum value in a domain of perpendicular distance to obtain a normalized perpendicular distance;
dividing the parallel distance by a maximum value in a domain of parallel distance to obtain a normalized parallel distance; and
determining a segment distance between the first line segment and the second line segment according to a weighted sum of the normalized angle distance, the normalized perpendicular distance, and the normalized parallel distance, and determining a sequence distance between the first sequence and the second sequence according to the segment distance, wherein a similarity between the first and second sequences is determined by the processor according to the segment distance between the first and second line segments; and
grouping the plurality of representative sequences into a plurality of clusters to find a plurality of moving trajectories of the crowd according to a plurality of said sequence distances between the plurality of sequences of each of the plurality of representative sequences.

2. The system according to claim 1, wherein the plurality of representative sequences further comprises:
the first sequence among the plurality of representative sequences, comprising the first line segment between a first start location point and a first end location point; and
the second sequence among the plurality of representative sequences, comprising the second line segment between a second start location point and a second end location point.

3. The system according to claim 2, wherein the calculating the parallel distance between the first line segment and the second line segment further comprises:
projecting the second start location point on an extended line of the first line segment to obtain a third start projection point;
projecting the second end location point on the extended line of the first line segment to obtain a third end projection point;
generating a third line segment by connecting the third start projection point to the third end projection point; and
determining the parallel distance by subtracting an intersection of the first line segment and the third line segment from an union of the first line segment and the third line segment.

4. The system according to claim 3, wherein the maximum value in the domain of angle distance is a length of a shorter of the first line segment and the second line segment, the maximum value in the domain of parallel distance is the union of the first line segment and the third line segment, and the maximum value in the domain of perpendicular distance is a perpendicular distance between the first line segment and a rotated line segment, wherein the rotated line segment is obtained by rotating the second line segment around the second start location point or the second end location point until the second line segment is perpendicular to the first line segment.

5. The system according to claim 2, wherein the determining the sequence distance between the first sequence and the second sequence further comprises:
generating a plurality of mapping combinations between the first sequence and the second sequence according to the at least one line segment in the first sequence and the at least one line segment in the second sequence;
calculating a mapping distance of each mapping combination; and
determining the sequence distance between the first sequence and the second sequence to be a minimum mapping distance among all of the plurality of mapping combinations.

6. The system according to claim 5, wherein the calculating the mapping distance of each mapping combination further comprises:
forming a plurality of mapping pairs between the at least one line segment in the first sequence and the at least one line segment in the second sequence according to a chronological order;
calculating a segment distance in each mapping pair; and
averaging segment distances of all the plurality of mapping pairs to obtain the mapping distance.

7. The system according to claim 1, wherein the collecting the plurality of location data associated with the plurality of user devices further comprises:
selecting a plurality of reference location points; and
replacing each location point in the plurality of location data with one of the plurality of reference location points that is geospatially closest to the each location point in the plurality of location data.

8. The system according to claim 1, wherein the mining the plurality of frequent patterns in the plurality of location data to generate the plurality of representative sequences further comprises:
removing a frequent pattern of the plurality of frequent patterns if the frequent pattern of the plurality of frequent patterns has only one location point;

removing identical adjacent location points in each frequent pattern; and aggregating the plurality of frequent patterns in a time period over a number of days to generate the plurality of representative sequences.

9. The system according to claim 1, wherein the grouping the plurality of representative sequences into the plurality of clusters comprises:

making each representative sequence one cluster;

calculating a cluster distance between each cluster pair that is formed by two clusters selected among the plurality of clusters;

finding a first cluster and a second cluster having a minimum cluster distance; and merging the first cluster and the second cluster if the minimum cluster distance is smaller than a distance threshold;

wherein the cluster distance of said cluster pair is calculated by averaging all the sequence distances between all pairs of representative sequences in said cluster pair, wherein a pair of representative sequences is formed by two representative sequences in the two respective clusters that form said cluster pair.

10. The system according to claim 1, further comprising:

classifying days into a plurality of day types; and finding a typical sequence for a target day type according to occurrence rates of the plurality of representative sequences in the target day type, wherein the finding the typical sequence for the target day type comprises:

calculating a first occurrence rate of a test representative sequence in days belonging to the target day type;

calculating a second occurrence rate of the test representative sequence in days not belonging to the target day type;

calculating a statistical entropy according to the first occurrence rate and the second occurrence rate; and determining the test representative sequence to be the typical sequence if the first occurrence rate is larger than a probability threshold and the statistical entropy is smaller than an entropy threshold.

11. The system according to claim 1, wherein the plurality of location data is collected when the plurality of user devices are used for payment activity.

12. A non-transitory computer readable medium with instructions stored thereon for finding crowd movement, that when executed on a processor, perform the steps comprising:

collecting a plurality of location data associated with a plurality of user devices of a crowd, according to logs of the plurality of user devices;

mining a plurality of frequent patterns in the plurality of location data to generate a plurality of representative sequences regarding information on movements of the crowd, wherein each representative sequence comprises a plurality of sequences and each sequence comprises at least one line segment between a starting location point and an end location point, wherein each at least one line segment in each of the plurality of representative sequences is a directional line segment indicating movement direction of the crowd;

for each sequence pair of the plurality of sequences:

calculating an angle distance, a perpendicular distance, and a parallel distance between a first line segment of a first sequence and a second line segment of a second sequence;

dividing the angle distance by a maximum value in a domain of angle distance to obtain a normalized angle distance;

dividing the perpendicular distance by a maximum value in a domain of perpendicular distance to obtain a normalized perpendicular distance;

dividing the parallel distance by a maximum value in a domain of parallel distance to obtain a normalized parallel distance; and determining a segment distance between the first line segment and the second line segment according to a weighted sum of the normalized angle distance, the normalized perpendicular distance, and the normalized parallel distance, and determining a sequence distance between the first sequence and the second sequence according to the segment distance, wherein a similarity between the first and second sequences is determined by the processor according to the segment distance between the first and second line segments; and grouping the plurality of representative sequences into a plurality of clusters to find a plurality of moving trajectories of the crowd according to a plurality of said sequence distances between the plurality of sequences of each of the plurality of representative sequences.

13. The non-transitory computer readable medium according to claim 12, wherein the plurality of representative sequences further comprises:

the first sequence among the plurality of representative sequences, comprising the first line segment between a first start location point and a first end location point; and the second sequence among the plurality of representative sequences, comprising the second line segment between a second start location point and a second end location point.

14. The non-transitory computer readable medium according to claim 13, wherein the calculating the parallel distance between the first line segment and the second line segment further comprises:

projecting the second start location point on an extended line of the first line segment to obtain a third start projection point;

projecting the second end location point on the extended line of the first line segment to obtain a third end projection point;

generating a third line segment by connecting the third start projection point to the third end projection point; and determining the parallel distance by subtracting an intersection of the first line segment and the third line segment from an union of the first line segment and the third line segment.

15. The non-transitory computer readable medium according to claim 14, wherein the maximum value in the domain of angle distance is a length of a shorter of the first line segment and the second line segment, the maximum value in the domain of parallel distance is the union of the first line segment and the third line segment, and the maximum value in the domain of perpendicular distance is a perpendicular distance between the first line segment and a rotated line segment, wherein the rotated line segment is obtained by rotating the second line segment around the second start location point or the second end location point until the second line segment is perpendicular to the first line segment.

16. The non-transitory computer readable medium according to claim 13, wherein the determining the sequence distance between the first sequence and the second sequence further comprises:
- generating a plurality of mapping combinations between the first sequence and the second sequence according to the at least one line segment in the first sequence and the at least one line segment in the second sequence;
- calculating a mapping distance of each mapping combination; and
- determining the sequence distance between the first sequence and the second sequence to be a minimum mapping distance among all of the plurality of mapping combinations.

17. The non-transitory computer readable medium according to claim 16, wherein the calculating the mapping distance of each mapping combination further comprises:
- forming a plurality of mapping pairs between the at least one line segment in the first sequence and the at least one line segment in the second sequence according to a chronological order;
- calculating a segment distance in each mapping pair; and
- averaging segment distances of all the plurality of mapping pairs to obtain the mapping distance.

18. The non-transitory computer readable medium according to claim 12, wherein the collecting the plurality of location data associated with the plurality of user devices further comprises:
- selecting a plurality of reference location points; and
- replacing each location point in the plurality of location data with one of the plurality of reference location points that is geospatially closest to the each location point in the plurality of location data.

19. The non-transitory computer readable medium according to claim 12, wherein the mining the plurality of frequent patterns in the plurality of location data to generate the representative sequences further comprises:
- removing a frequent pattern of the plurality of frequent patterns if the frequent pattern of the plurality of frequent patterns has only one location point;
- removing identical adjacent location points in each frequent pattern; and
- aggregating the plurality of frequent patterns in a time period over a number of days to generate the plurality of representative sequences.

20. The non-transitory computer readable medium according to claim 12, wherein the grouping the plurality of representative sequences into the plurality of clusters comprises:
- making each representative sequence one cluster;
- calculating a cluster distance between each cluster pair that is formed by two clusters selected among the plurality of clusters;
- finding a first cluster and a second cluster having a minimum cluster distance; and
- merging the first cluster and the second cluster if the minimum cluster distance is smaller than a distance threshold;
- wherein the cluster distance of said cluster pair is calculated by averaging all the sequence distances between all pairs of representative sequences in the cluster pair, wherein a pair of representative sequences is formed by two representative sequences in the two respective clusters that form said cluster pair.

21. The non-transitory computer readable medium according to claim 12, further comprising:
- classifying days into a plurality of day types; and
- finding a typical sequence for a target day type according to occurrence rates of the plurality of representative sequences in the target day type, wherein the finding the typical sequence for the target day type comprises:
  - calculating a first occurrence rate of a test representative sequence in days belonging to the target day type;
  - calculating a second occurrence rate of the test representative sequence in days not belonging to the target day type;
  - calculating a statistical entropy according to the first occurrence rate and the second occurrence rate; and
  - determining the test representative sequence to be the typical sequence if the first occurrence rate is larger than a probability threshold and the statistical entropy is smaller than an entropy threshold.

22. The non-transitory computer readable medium according to claim 12, wherein the plurality of location data is collected when the plurality of user devices are used for payment activity.

* * * * *